US012809414B2

(12) United States Patent
Touzard et al.

(10) Patent No.: US 12,809,414 B2
(45) Date of Patent: Nov. 24, 2026

(54) BIASING CIRCUIT

(71) Applicant: STMicroelectronics International N.V., Geneva (CH)

(72) Inventors: Olivier Touzard, Grenoble (FR); Jocelyn Roux, Hurtieres (FR)

( * ) Notice: Subject to any disclaimer, the term of this patent is extended or adjusted under 35 U.S.C. 154(b) by 0 days.

(21) Appl. No.: 19/047,066

(22) Filed: Feb. 6, 2025

(65) Prior Publication Data

US 2025/0264899 A1 Aug. 21, 2025

(30) Foreign Application Priority Data

Feb. 19, 2024 (FR) ....................................... 2401594

(51) Int. Cl.
*G05F 3/26* (2006.01)
*G05F 1/10* (2006.01)

(52) U.S. Cl.
CPC ................ *G05F 3/262* (2013.01); *G05F 1/10* (2013.01)

(58) Field of Classification Search
CPC ... G05F 3/262; G05F 1/10; G05F 1/46; G05F 1/52; G05F 1/54; G05F 1/56; G05F 3/02; G05F 3/08; G05F 3/16; G05F 3/20; G05F 3/26
See application file for complete search history.

(56) References Cited

U.S. PATENT DOCUMENTS 5,940,322 A * 8/1999 Atsumi .................. G11C 16/24 365/189.09
10,429,877 B1 10/2019 Aboudina et al.
2015/0286235 A1 10/2015 Vahid Far et al.

OTHER PUBLICATIONS

French Search Report for Application No. 2401594, dated Sep. 16, 2024, 26 pages.
Hegazi, et al., "A Filtering Technique to Lower LC Oscillator Phase Noise", *IEEE Journal of Solid-State Circuits*, vol. 36, No. 12, Dec. 2001, (10 pages).

* cited by examiner

*Primary Examiner* — Jung Kim
(74) *Attorney, Agent, or Firm* — Alston & Bird LLP

(57) ABSTRACT

A bias circuit comprises a PMOS current source and a current mirror. The current mirror comprising: a first NMOS transistor connected between the current source and a first resistor connected to a first node, and a second NMOS transistor receiving a power supply potential, mirror-assembled with the first NMOS transistor and coupled to a third node by a second resistor; a capacitor connected between the second node and a reference potential; and a capacitor connected between the third node and the reference potential, the second and third nodes being connected to a node delivering a bias current.

15 Claims, 3 Drawing Sheets

BIASING CIRCUIT

CROSS REFERENCE TO RELATED APPLICATION(S)

This application claims the priority benefit of French Patent Application No. 24/01594 filed on Feb. 19, 2024, entitled "Circuit de Polarisation," which is hereby incorporated by reference to the maximum extent allowable by law.

TECHNICAL FIELD

The present disclosure generally concerns electronic circuits, for example integrated electronic circuits, and for example radio frequency electronic circuits. The present disclosure more particularly concerns a bias circuit configured to supply a bias current to a circuit to be biased.

BACKGROUND

Known bias circuits comprise a bias terminal configured to receive a bias current, and another terminal configured to be connected to a reference potential. In these known circuits, the bias terminal is at a positive potential and referenced to the reference potential, for example the ground. Oscillators, for example the radio frequency oscillators, are examples of circuits to be biased such as described hereabove.

Known bias circuits are configured to supply a bias current to the bias terminal of a circuit to be biased such as described hereabove, from a PMOS current source. By PMOS current source, there is here meant a current source comprising a PMOS transistor having its source coupled to a node configured to receive a power supply potential from the current source and having its drain configured to supply the output current of the current source.

As an example, the bias circuit comprises a bandgap circuit coupled to the PMOS current source. The PMOS current source and the bandgap circuit are, for example, configured so that the output current of the current source, which is delivered by its PMOS transistor, is a copy of a current flowing through the bandgap circuit.

As an example, bandgap circuits are configured to implement a temperature-stable (or constant) voltage source. These bandgap circuits may comprise a resistive element across which the temperature-stable voltage or a voltage proportional to absolute temperature (PTAT) is applied. The resistive element may be a value independent from temperature or, on the contrary, temperature-dependent, and the current flowing therethrough may then be a current of temperature-stable type, of complementary to absolute temperature (CTAT) or proportional to absolute temperature (PTAT) type.

As an example, the current source, for example when it is coupled to a bandgap circuit, is configured to supply a temperature-stable type current, a PTAT-type current, a CTAT-type current, or a current corresponding to a combination of currents of at least two types among the three types of currents defined hereabove.

The known biasing circuits described hereabove have various disadvantages. There thus exists a need for a bias circuit of the type described hereabove overcoming all or part of the disadvantages of the above-described known bias circuits.

BRIEF SUMMARY

An embodiment overcomes all or part of the disadvantages of known bias circuits of the above-described type.

An embodiment provides a bias circuit comprising:

- a current source comprising a PMOS transistor having its source coupled to a first node configured to receive a first power supply potential, and its drain configured to supply an output current of the current source;
- a current mirror comprising:
  - a first NMOS transistor having its drain coupled to its gate and to the drain of the PMOS transistor, and its source coupled to a second node by a first resistor, and
  - a second NMOS transistor having its drain coupled to a third node configured to receive a second power supply potential, its gate coupled to the gate of the first NMOS transistor, and its source coupled to a fourth node by a second resistor;
- a decoupling capacitor connected between the second node and a node configured to receive a reference potential; and
- a decoupling capacitor connected between the fourth node and a node configured to receive the reference potential,
- wherein the second and fourth nodes are connected to an output node configured to be connected to a first terminal of a circuit to be biased configured to receive a bias current on its first terminal and the reference potential on a second terminal of the circuit to be biased.

According to an embodiment, the current mirror comprises an RC filter between the drain of the first NMOS transistor and the output node or between the gate of the first NMOS transistor and the output node.

According to an embodiment, the RC filter comprises a resistor connected between the gate of the first NMOS transistor and the gate of the second NMOS transistor, and a capacitive element connected between the gate of the second NMOS transistor and the output node.

According to an embodiment, the first and second power supply potentials are positive with respect to the reference potential.

According to an embodiment, the first power supply is higher than the second power supply potential, potential preferably by at least one MOS transistor gate-source voltage.

According to an embodiment, the bias circuit comprises a bandgap circuit coupled to the current source, the bandgap circuit and the current source being configured so that the output current of the current source is determined by a current flowing through the bandgap circuit, for example, so that the output current is a current of temperature-stable type, a current of proportional to absolute temperature type, a current of complementary to absolute temperature type, or a combination of a plurality of currents of temperature-stable type and/or of proportional to absolute temperature type and/or of complementary to absolute temperature type.

According to an embodiment, dimensions of the second NMOS transistor and dimensions of the first NMOS transistor are configured so that the current in the second NMOS transistor is equal to N times the current in the first NMOS transistor, with N greater than 1, for example greater than 10.

An embodiment provides a device comprising a bias circuit such as hereabove, and a circuit to be biased comprising a first terminal connected to the output node of the bias circuit, and a second terminal connected to the reference potential.

According to an embodiment, the circuit to be biased is configured to be powered by a potential difference between its first and second terminals resulting from the supply of the bias current by the bias circuit to the first terminal of the circuit to be biased.

According to an embodiment, the circuit to be biased is a radio frequency circuit configured to operate at frequencies higher than 1 GHZ, preferably higher than 10 GHZ, or even higher than or equal to 20 GHZ.

According to an embodiment, the bias circuit comprises a filtering inductor connected between its second terminal and an internal node of the circuit to be biased, the internal node being coupled to the first terminal of the circuit to be biased.

According to an embodiment, the circuit to be biased is an oscillator comprising:

- a filtering inductor connected between its second terminal and an internal node of the circuit to be biased;
- a third NMOS transistor and a fourth NMOS transistor identical to the third NMOS transistor, the sources of the third and fourth transistors being connected to the internal node of the circuit to be biased, the gate of the third NMOS transistor being connected to the drain of the fourth NMOS transistor, and the gate of the fourth NMOS transistor being connected to the drain of the third NMOS transistor;
- a first inductor connected between the first terminal and the drain of the third NMOS transistor;
- a second inductor connected between the first terminal and the drain of the fourth NMOS transistor; and
- a capacitive element connected between the drains of the third and fourth NMOS transistors. Preferably, the first and second inductances and the filtering inductance of the oscillator are each implemented by a corresponding conductive line portion.

According to an embodiment, the capacitive element of the oscillator comprises a capacitor with a voltage-controlled value.

According to an embodiment, the device further comprises a buffer circuit comprising:

- a filtering inductor connected between a node configured to receive the reference potential and a first internal node of the buffer circuit;
- a fifth NMOS transistor and a sixth NMOS transistor, identical and each having their source connected to the first internal node, the gate of the fifth NMOS transistor being connected to the drain of the third NMOS transistor and the gate of the sixth NMOS transistor being connected to the drain of the fourth NMOS transistor;
- a seventh NMOS transistor and an eighth NMOS transistor, identical, each having its drain connected to a node configured to receive a power supply potential from the buffer circuit, the seventh NMOS transistor having its source connected to the drain of the fifth NMOS transistor and its gate coupled to the gate of the sixth NMOS transistor by a capacitor and to a second internal node of the buffer circuit by a resistor, the eighth NMOS transistor having its source connected to the drain of the sixth NMOS transistor and its gate coupled to the gate of the fifth NMOS transistor by another capacitor and to the second internal node by another resistor, the second internal node being configured to receive a bias potential.

According to an embodiment, the bias circuit comprises a conductive line portion having one end connected to the decoupling capacitor connected to the second node of the bias circuit and another end connected to the decoupling capacitor connected to the fourth node of the bias circuit, the conductive line portion comprising the second and fourth nodes and the output node of the bias circuit.

BRIEF DESCRIPTION OF THE DRAWINGS

The foregoing features and advantages, as well as others, will be described in detail in the rest of the disclosure of specific embodiments given as an illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front", "back", "top", "bottom", "left", "right", etc., or relative position qualifiers, such as "top", "bottom", "upper", "lower", etc., or orientation qualifiers, such as "horizontal", "vertical", etc., reference is made unless otherwise specified to the orientation of the drawings.

Unless specified otherwise, the expressions "about", "approximately", "substantially", and "in the order of" signify plus or minus 10% or 10°, preferably of plus or minus 5% or 5°.

Figure 1:
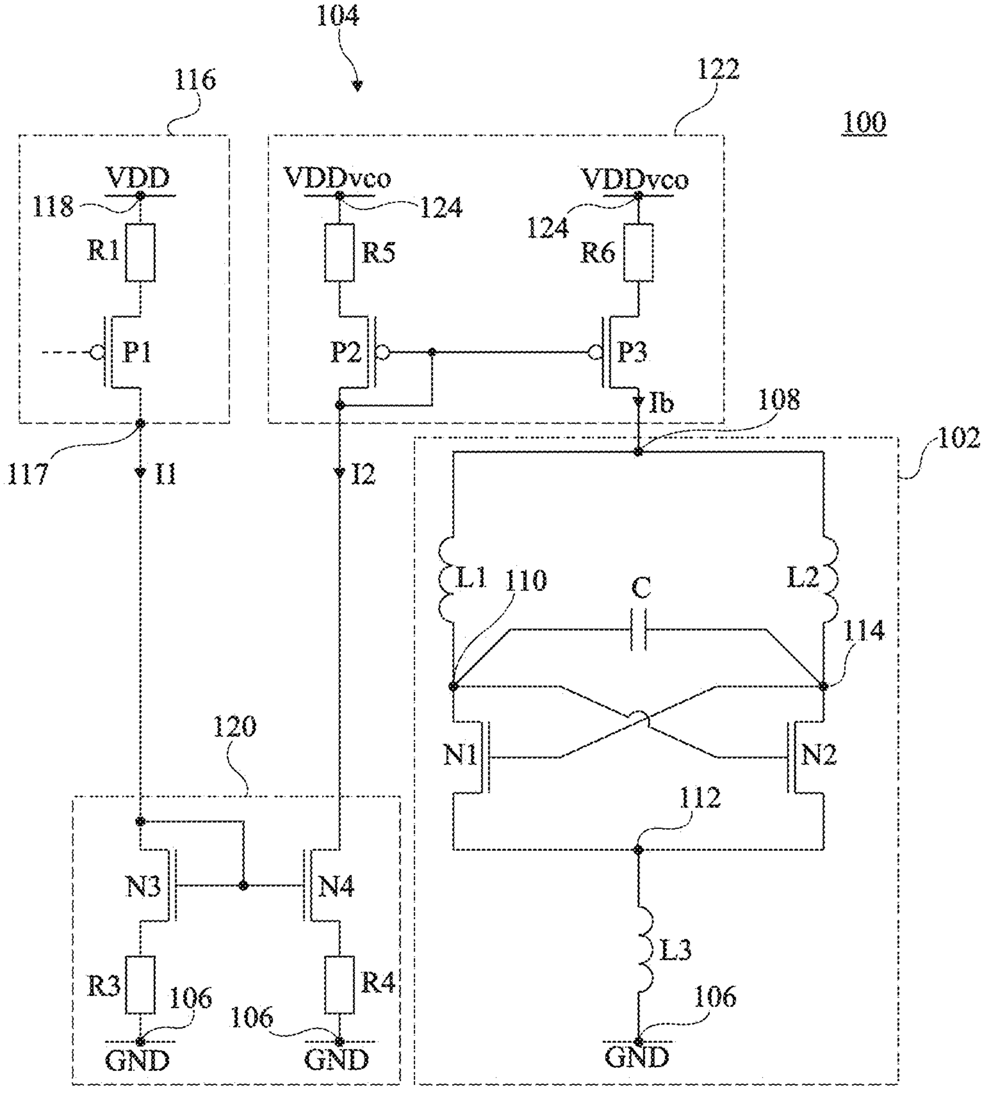
FIG. 1 shows an example of a device comprising a circuit to be biased and a bias circuit.

FIG. 1 shows an example of a device 100. Device 100 comprises a circuit to be biased 102 of the previously-described type, and a bias circuit 104.

In this example, the circuit to be biased 102 is an oscillator, for example a radio frequency oscillator configured to deliver a radio frequency signal at a frequency greater than 1 GHz, for example greater than 10 GHZ, preferably greater than or equal to 20 GHZ.

Oscillator 102 comprises a terminal 106 connected to a reference potential such as ground GND. Oscillator 102 further comprises a bias terminal 108. Terminal 108 is configured to receive a bias current Ib. Oscillator 102 is configured to be powered by the current Ib received by its terminal 108. This current Ib and the configuration of oscillator 102 result in the potential on terminal 108 being positive and referenced to reference potential GND. In other words, circuit 102 is configured so that, when it receives a bias current Ib on its terminal 108, a potential difference is created between its terminals 108 and 106.

More particularly, the terminal 108 of oscillator 102 is configured to be coupled to a power supply potential VDDvco, positive and referenced to ground GND. Potential VDDvco corresponds to the power supply potential of oscillator 102. To limit the power consumption of oscillator 102, it is desired to decrease the value of potential VDDvco.

Oscillator 102 comprises an inductor L1, for example implemented by a conductive line portion, connected between terminal 108 and a node 110 of oscillator 102. For example, one end of inductor L1 is connected to node 110 and the other end of inductor L1 is connected to terminal 108. Oscillator 102 further comprises an N-channel MOS ("Metal Oxide Semiconductor") transistor, or NMOS transistor, N1. Transistor N1 is connected between node 110 and a node 112 of oscillator 102. For example, the drain of transistor N1 is connected to node 110 and the source of transistor N1 is connected to node 112.

Symmetrically, oscillator 102 comprises an inductor L2, for example identical to inductor L1, connected between terminal 108 and a node 114 of oscillator 102. For example, one end of inductance L2 is connected to node 114 and the other end of inductor L2 is connected to terminal 108. Oscillator 102 further comprises an NMOS transistor N2. Transistor N2 is connected between node 114 and node 112. For example, the drain of transistor N2 is connected to node 114 and the source of transistor N2 is connected to node 112.

The gate of transistor N1 is connected to the drain 114 of transistor N2, the gate of transistor N2 being connected to the drain 110 of transistor N1. In other words, transistors N1 and N2 form a pair of cross-coupled NMOS transistors.

Nodes 110 and 114 then form the outputs of oscillator 102, that is, a differential periodic signal is available between nodes 110 and 114.

The oscillator comprises a capacitive element C connected between nodes 110 and 114. For example, a first terminal of capacitive element C is connected to node 110, a second terminal of element C being connected to node 114.

Oscillator 102 further comprises an inductor connected between node 112 and terminal 106. Inductor L3 has one terminal connected to terminal 106, and its other terminal connected to node 112, the latter being coupled to terminal 108. Inductor L3 is for example implemented by a conductive line portion. This inductor L3 is configured to filter the harmonics of rank two in oscillator 102. This filtering inductor L3 is commonly referred to as a "stub".

Oscillator 102 is, in this example, implemented from a pair of cross-coupled NMOS transistors (N1 and N2 in FIG. 1) rather than from a pair of cross-coupled PMOS transistors, which allows the frequency of oscillator 102 to be higher, for example greater than or equal to 10 GHZ.

Further, in oscillator 102, the provision of filtering inductor L3 imposes for the current biasing of oscillator 102 to take place on its terminal 108.

In this example, bias circuit 104 is configured to supply current Ib to the terminal 108 of bias circuit 102.

Circuit 104 comprises a PMOS current source 116. Current source 116 is configured to supply a current I1.

As an example, circuit 104 comprises a bandgap circuit coupled to current source 116. Current source 116 and the bandgap circuit are, for example, configured so that current I1 is independent from temperature. However, in alternative examples, current source 116 and the bandgap circuit are configured so that current I1 is a current of PTAT type, of CTAT type, or also a current corresponding to a combination of a plurality of temperature-stable and/or PTAT-type and/or CTAT-type currents. In the case where the circuit to be biased 102 is an LC-type radio frequency oscillator, for example voltage-controlled, it is preferable for the current I1 delivered by current source 116, and thus current Ib, to be a PTAT-type current so as to compensate for the decrease in the quality factor Q of the oscillator 102 along with the temperature increase.

Current source 116 comprises a P-channel MOS, or PMOS, transistor P1. Transistor P1 has its source coupled to a node 118 configured to receive a power supply potential VDD and its drain 117 configured to supply the output current I1 of current source 116. For example, current source 116 comprises a resistor R1 coupling the source of transistor P1 to node 118. For example, resistor R1 has one terminal connected to node 118 and another terminal connected to the source of transistor P1.

Preferably, although this is not detailed in FIG. 1, current source 116 is referenced to potential GND. Potential VDD is higher than potential VDDvco, which enables to have a resistor R1 of higher value as compared with the case where the potential VDD would have been equal to potential VDDvco. Further, although this is not detailed in FIG. 1, transistor P1 forms part of a current mirror in which the 1/f noise decreases as the value of resistor R1 is increased, this resistor R1 being, for example, called degeneration resistor. The 1/f noise is the low-frequency noise ("flicker noise") which decreases in 1/(fa) with f the frequency and has a coefficient for example in the range from 0.8 to 1.3, and empirically determined.

To produce current Ib from current I1, bias circuit 104 comprises a current mirror 120 with NMOS transistors, and a current mirror 122 with PMOS transistors.

Mirror 120 is configured to supply current mirror 122 with a copy 12 of current I1, current mirror 122 being configured to supply current Ib from current I2, current Ib being a copy of current I2.

In the present disclosure, a second current is considered as being a copy of a first current, for example, when the second current is supplied by a current mirror from the first current and the second current is equal to K times the first current, with K a positive factor. Factor K is, for example, determined by a size ratio between the transistors of the current mirror, and, when the mirror comprises degeneration resistors, by the inverse of the ratio of the values of the degeneration resistors.

For example, current mirror 120 comprises an NMOS transistor N3 having its drain connected to current source 116 in such a way as to receive current I1, and its source coupled to node 106 by a resistor R3. For example, the drain of transistor N3 is connected to the drain 117 of transistor P1. For example, resistor R3 has one terminal connected to node 106 and another terminal connected to the source of transistor N3. Transistor N3 is diode-assembled, and thus has its gate coupled, for example connected, to its drain. The current mirror 120 further comprises an NMOS transistor N4 mirror-assembled with transistor N3. Transistor N4 has its gate connected to the gate of transistor N3, its drain configured to supply current I2, and its source coupled to node 106 by a resistor R4. For example, resistor R4 has one terminal connected to the source of transistor N4, and another terminal connected to node 106. In the example of FIG. 1, transistors N3 and N4 have the same dimensions, and degeneration resistors R3 and R4 have the same dimensions, whereby current I1 is equal to current I2.

For example, current mirror 122 comprises a PMOS transistor P2 having its drain connected to current mirror 120 so as to receive current I2, and its source coupled to a node 124 by a resistor R5, node 124 being configured to receive power supply potential VDDvco. For example, the drain of transistor P2 is connected to the drain of transistor N4. For example, resistor R5 has one terminal connected to node 124 and another terminal connected to the source of transistor P2. Transistor P2 is diode-assembled, and thus has its gate coupled, for example connected, to its drain. Current mirror 122 further comprises a PMOS transistor P3 mirror-assembled with transistor P2. Transistor P3 has its gate connected to the gate of transistor P2, its drain configured to supply current Ib, and its source coupled to node 124 by a resistor R6. For example, resistor R6 has one terminal connected to the source of transistor P3, and another terminal connected to node 124. In the example shown in FIG. 1, transistor P3 is K times larger than transistor P2, and the value of degeneration resistor R6 is K times smaller than that of degeneration resistor R5, whereby current Ib is equal to K times current I2, with K greater than 1.

In device 100, the dynamic voltage Dv available between the main conduction terminals (source and drain) of transistor N4 is expressed as follows:

$$Dv = \text{VDDVCO} - R5*I2 - VsgP2 - R4*I2, \text{with } VsgP2 \text{ the source-gate voltage of transistor } P2.$$

Due to the fact that it is desired to decrease the value of potential VDDvco to limit the power consumption by oscillator 102, this tends to decrease the value of dynamic voltage Dv, which must however remain sufficiently high for current mirror 120 to be functional. As a result, it is tended to decrease the value of degeneration resistors R4 and R5, which tends to increase the 1/f noise. Now, it is desirable to reduce the 1/f noise.

To overcome the disadvantages of device 100, and in particular the disadvantages of its bias circuit 104, there is here provided a bias circuit comprising a current mirror with NMOS transistors referenced to the potential of the node to which the bias circuit supplies bias current Ib. A branch of the current mirror is connected to PMOS current source 116, and is thus powered with potential VDD, the other branch of the mirror being connected to potential VDDvco.

Figure 2:
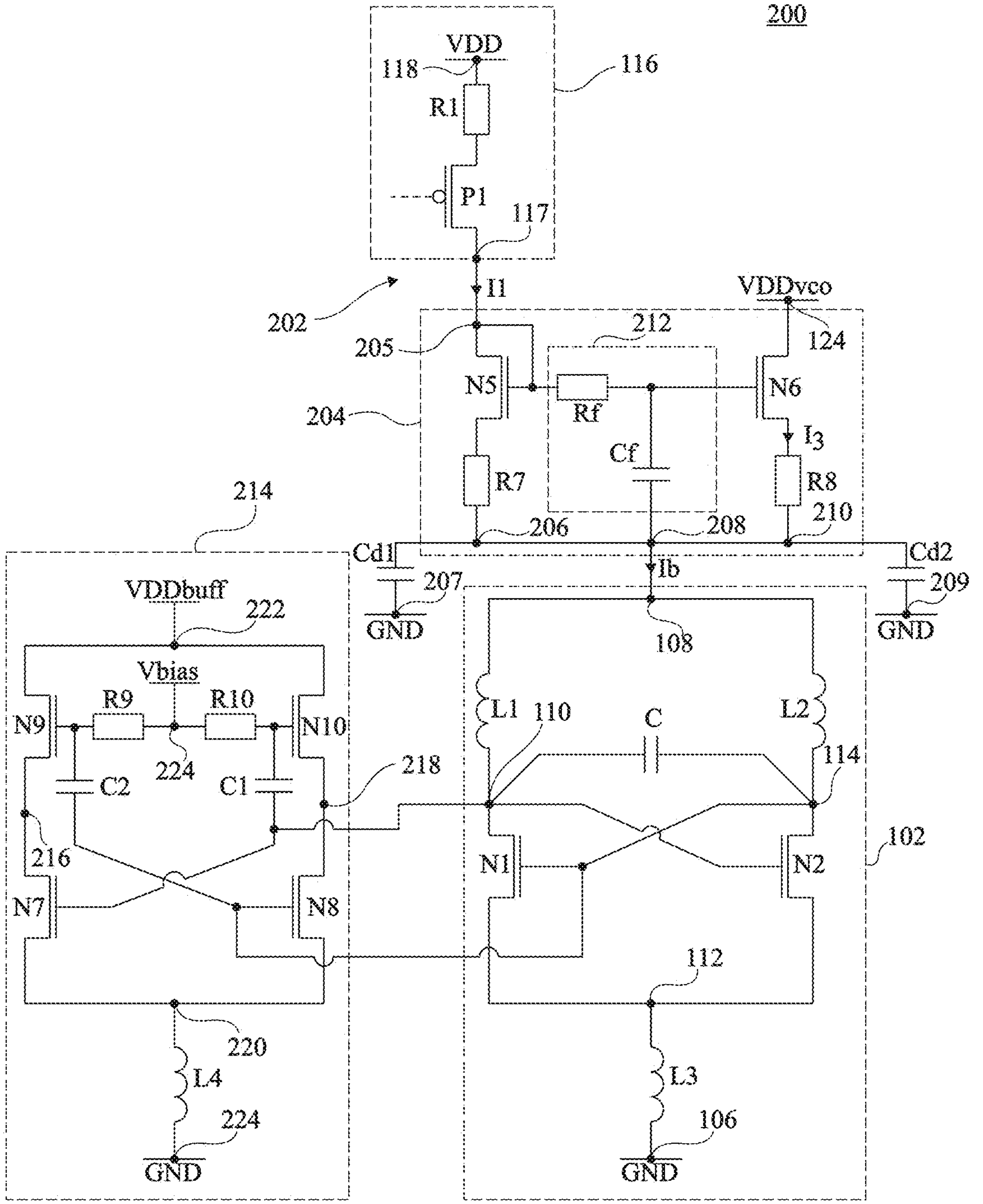
FIG. 2 shows an example of a device comprising an embodiment of a bias circuit and a circuit to be biased.

FIG. 2 shows an example of a device 200 comprising an example of a bias circuit 202 and the circuit to be biased 102.

Device 200 has many features in common with device 100, and only the differences between these two devices are here highlighted. Thus, unless otherwise indicated, everything that has been described for an element in relation with FIG. 1 applies to that element when it forms part of the device of FIG. 2.

More particularly, device 200 differs from device 100 in that bias circuit 104 is replaced with a bias circuit 202.

Circuit 202 comprises current source 116 configured to supply current I1.

For example, circuit 202 comprises a bandgap circuit coupled to current source 116. The bandgap circuit and current source 116 are, for example, configured so that current I1 is a current of CTAT type, of PTAT type, of temperature-stable type, or a combination of a plurality of currents of at least two types among the three types of current defined hereabove.

As an example, the bandgap circuit and/or current source 116 are, for example, configured so that the output current I1 of current source 116 is a copy of a current Vbg/R, Vptat/R, or Vbg/Rcst of the bandgap circuit, where Vbg/R is a current flowing through a resistor R, across which a temperature-stable voltage Vbg is applied, Vptat/R is a current flowing through a resistor R, across which a voltage proportional to the absolute temperature Vptat is applied, and Vbg/Rcst is a current flowing through a resistor Rest, across which a temperature-stable voltage Vbg is applied, Vptat/R a current flowing through a resistor R across which a voltage proportional to the absolute temperature Vptat is applied, and Vbg/Rcst a current flowing through a resistor Rcst across which a temperature-stable voltage Vbg is applied, resistor R having a temperature-dependent value, and resistor Rcst having a temperature-stable value. The current I1 may also be a copy of a combination of at least two of currents Vbg/R, Vptat/R, and Vbg/Rcst.

Circuit 202 further comprises a current mirror 204. Current mirror 204 is configured to receive current I1 and to supply current Ib to node 108 of bias circuit 102.

Circuit 204 comprises an NMOS transistor N5 having its drain connected to the output of current source 116, that is, to the drain 117 of transistor P1, so as to receive current I1. The drain 205 of transistor N5 is coupled to the gate of transistor N5, for example connected to the gate of transistor N5 in the example of FIG. 2. Transistor N5 has its source coupled to a node 206 by a resistor R7. Node 206 is connected to an output node 208 of circuit 202, this node 208 being configured to be connected to a bias terminal of a circuit to be biased, for example to be connected to terminal 108 of circuit 102 as shown in FIG. 2. For example, resistor R7 has one terminal connected to the source of transistor N5 and another terminal connected to node 206.

Circuit 204 further comprises an NMOS transistor N6 having its drain coupled, preferably connected, to node 124 configured to receive potential VDDvco, and its source coupled to node 210 by a resistor R8. Node 210 is connected to node 208. For example, resistor R8 has one terminal connected to the source of transistor N6 and another terminal connected to node 210.

Transistor N6 is configured so that a current I3 which is a copy of current I1 flows between its main conduction terminals. Thus, circuit 202 supplies current Ib, which is then equal to the sum of currents I1 and I3.

Transistor N6 thus has its gate coupled to the gate of transistor N5. Further, the values of resistors R8 and R7 with respect to each other are fixed by the size ratio between transistors N5 and N6. For example, when transistor N6 is N times larger than transistor N5, with N greater than 1, for example greater than 10, the value of resistance R8 is N times smaller than that of resistance R7, so that current I3 is equal to N times current I1 and current Ib is equal to N+1 times current I1.

According to an embodiment, current mirror 204 comprises an RC filter 212 between the drain 205 or the gate of transistor N5 and node 208. This RC filter 212 enables to filter, that is, to decrease, the noise originating from bias circuit 202.

For example, in FIG. 2, filter 212 is connected between the gate of transistor N5 (and thus the drain of transistor N5) and node 208. Filter 212 comprises a capacitive element Cf connected between the gate of transistor N6 and node 208, and a resistive element Rf connected between the gate of transistor N6 and the gate of transistor N5, element Rf having, for example, one terminal connected to the gate of transistor N5 and another terminal connected to element Cf and to the gate of transistor N6.

As an alternative example, filter 212 is connected between the drain of transistor N5 and node 208. The resistive element Rf of filter 212 is then connected between drain 205 and the gate of transistor N5, and the gate of transistor N5 is connected to capacitive element Cf and to the gate of transistor N6, capacitive element Cf being connected between the gate of transistor N5 and node 208. In this alternative example, filter 212 enables, for example, to filter the noise transmitted through transistor N5 and resistor R7, for example by displacing resistive element Rf between the drain and the source of transistor N5 and by adding an additional filtering capacitor between the drain 205 of transistor N5 and node 207.

According to an alternative embodiment, filter 212 is omitted.

Further, to stabilize the value of the potential of the node 208 (or 108) having current mirror 204 referenced thereto, bias circuit 202 comprises a decoupling capacitor Cd1 connected between node 206 and a node 207, and a decoupling capacitor Cd2 connected between node 210 and a node 209, each of nodes 207 and 209 being configured to receive reference potential GND.

As an example, circuit 202 comprises a conductive line portion having one end connected to capacitor Cd1 and another end connected to capacitor Cd2, and nodes 206, 208 and 210 belong to this conductive line portion. For example, node 208 is arranged in the middle of this conductive line portion, nodes 206 and 210 being for example arranged on either side of node 208, preferably at a same distance from node 208.

In device 100, the correct operation of bias circuit 104 was limited by the dynamic voltage Dv available for the output transistor N4 of current mirror 120. In device 200, the correct operation of bias circuit 202 is limited by the dynamic voltage Dv' available for the transistor P1 of current source 116, this dynamic voltage Dv' being expressed as:

$$Dv' = \text{VDD} - I1*R1 - VgsN5 - I1*R7 - VgsN2,$$ with $VgsN5$ the gate-source voltage of transistor $N5$ and $VgsN2$ the gate-source voltage of transistor $N2$.

Taking equal resistance values for resistors R1 (FIGS. 1 and 2), R5 (FIG. 1), R4 (FIG. 1), and R7 (FIG. 2), voltages VgsN5, VsgP2, and VgsN2 equal or nearly equal to a value Vgs, and equal currents I1 and I2, one obtains:

$$Dv' - Dv = \text{VDD} - \text{VDD}vco - Vgs.$$

As a result, if VDD is greater than VDDvco by at least the value Vgs, the dynamic voltage Dv' available for the transistor P1 of bias circuit 202 is greater than the dynamic voltage Dv available for the transistor N4 of bias circuit 104.

Further, bias circuit 202 is more compact than bias circuit 104.

Moreover, bias circuit 202 comprising one less current mirror than bias circuit 104, circuit 202 is less noisy than circuit 104.

According to an embodiment, the dimensions of transistor N6 are controllable, which enables the ratio N of current mirror 204 to be controllable, and thus the value of current Ib to be controllable. In this case, the value of resistance R8 is also controllable so that current I3 remains equal to N times current I1, with the value of N determined by the dimensions of transistor N6. For example, transistor N6 is formed of N transistors in parallel, each having the same dimensions as transistor N5, and resistor R8 is formed of N resistors in parallel, each having the same value as resistor R7, and the number N of transistors in parallel and of resistors in parallel is controllable.

According to an embodiment, the capacitive element C of oscillator 102 comprises a voltage-controlled capacitor, whereby the frequency of oscillator 102 is voltage-controllable. In other words, oscillator 102 is a voltage-controlled oscillator. As an example, capacitive element C comprises a capacitor of fixed value and at least one voltage-controlled capacitor, for example a first voltage-controlled capacitor allowing a coarse adjustment of the capacitance value of element C, and a second voltage-controlled capacitor allowing a fine adjustment of the capacitance value of element C.

According to an embodiment, when the circuit 102 of device 200 is an oscillator as described in relation with the example of embodiment of FIG. 2, device 200 may comprise a buffer circuit 214 as shown in FIG. 2.

Circuit 214 is connected to the outputs 110 and 114 of oscillator 102, and is configured to deliver, between two output nodes 216 and 218 of circuit 214, an image of the signal available between nodes 110 and 114, and, on an output node 220 of circuit 214, a signal at a frequency twice higher than that of the output signal of oscillator 102.

Circuit 214 comprises a bias terminal 222 configured to receive a power supply potential VDDbuff from circuit 214, and a terminal 224 configured to receive reference potential GND. Potential VDDbuff is positive and referenced to reference potential GND.

In the example of FIG. 2, circuit 214 comprises a filtering inductor L4, for example similar or identical to inductor L3. Preferably, inductor L4 is matched to inductor L3. Inductance L4 is connected between terminal, or node, 224 and the output node 220 of circuit 214, which node 220 corresponds to an internal node of circuit 214. Circuit 214 further comprises two identical NMOS transistors N7 and N8, each having its sources connected to node 220. Preferably, transistors N7 and N8 are matched to transistors N1 and N2. The gate of transistor N7 is connected to the node 110 of oscillator 102, the gate of transistor N8 being connected to the node 114 of oscillator 102. The drain of transistor N7 is coupled, preferably connected, to node 216, the drain of transistor N8 being coupled, preferably connected, to node 218. Circuit 214 also comprises two identical NMOS transistors N9 and N10. The drains of both transistors N9 and N10 are connected to terminal, or node, 222 configured to receive the power supply potential of circuit 214. The source of transistor N10 is coupled, preferably connected, to node 218, the source of transistor N9 being coupled, preferably connected, to node 216. The source of transistor N10 is further coupled to the gate of transistor N7 by a capacitive element C1, the source of transistor N9 being coupled to the gate of transistor N8 by a capacitive element C2. For example, capacitive element C1 has one terminal connected to the gate of transistor N10 and another terminal connected to the gate of transistor N7, and capacitive element C2 has one terminal connected to the gate of transistor N9 and another terminal connected to the gate of transistor N8. The gate of transistor N9, respectively N10, is further coupled to a node 224 by a resistor R9, respectively R10, node 224 being configured to receive a bias potential Vbias. For example, resistor R9 has one terminal connected to the gate of transistor N9 and another terminal connected to node 224, resistor R10 having one terminal connected to the gate of transistor N10 and another terminal connected to node 224.

In FIGS. 1 and 2, the circuit to be biased is an oscillator, for example a radio frequency oscillator. However, bias circuit 202 may be used to supply a bias current to other bias circuits than an oscillator, as long as this bias current is to be supplied to a bias terminal of the bias circuit which is at a positive potential with respect to the reference potential applied to another terminal of this bias circuit.

Figure 3:
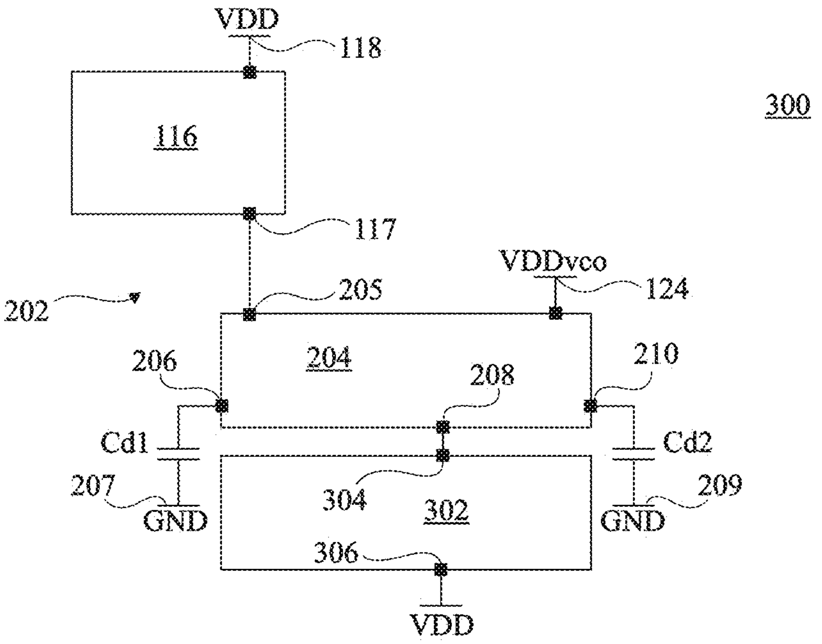
FIG. 3 shows, schematically and in the form of blocks, a device comprising a circuit to be biased and the bias circuit of FIG. 2.

FIG. 3 shows, schematically and in the form of blocks, a device 300 comprising a circuit to be biased 302 and bias circuit 202.

Circuit 202 comprises current source 116, current mirror 204, and decoupling capacitive elements Cd1 and Cd2. As an example, circuit 202 comprises a bandgap circuit, as described in relation with FIG. 2.

The output 117 of current source 116 is connected to node 205 of the current mirror. The current source is connected to node 118 receiving potential VDD.

Current mirror 204 is connected to node 124 configured to receive potential VDDvco. Nodes 206 and 210 of current mirror 204 are connected to respective capacitors Cd1 and Cd2, capacitors Cd1 and Cd2 coupling the respective nodes 206 and 210 to the respective nodes 207 and 209. Node 208 of current mirror 204 is connected to a bias terminal 304 of the circuit to be biased 302.

The circuit to be biased 302 further comprises a terminal 306 configured to receive reference potential GND. Circuit 302 is configured to be powered by the current Ib received on its terminal 304, which results in the presence of a positive potential on its terminal 304, and thus in a potential difference between its terminals 304 and 306.

According to an embodiment, the circuit to be biased 302 is a radio frequency circuit, that is, a circuit configured to operate at frequencies higher than 1 GHZ, for example higher than 10 GHZ, preferably higher than or equal to 20 GHZ.

Although this is not illustrated in FIG. 3, the circuit to be biased 302 comprises, for example, a filtering inductor connected between terminal or node 306 and an internal node of circuit 302, this internal node being coupled to terminal 304 of circuit 302. As already indicated, the presence of such a filtering inductor makes it impossible to deliver a bias current to the circuit 302 on its terminal 306. However, in other examples, the circuit to be biased 302 does not comprise such a filtering inductor, but has to be biased by a PMOS current source delivering the bias current on terminal 304 of circuit 302, for example because the terminal 306 of circuit 302 has to be directly connected to the reference potential, for example ground GND. Thus, circuit 302 may be a circuit other than an oscillator, voltage-controlled or not.

Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

The invention claimed is:

1. A bias circuit comprising:

a current source comprising a PMOS transistor having its source coupled to a first node configured to receive a first power supply potential, and its drain configured to supply an output current of the current source;

a current mirror comprising:

a first NMOS transistor having its drain coupled to its gate and to the drain of the PMOS transistor, and its source coupled to a second node by a first resistor, and a second NMOS transistor having its drain coupled to a third node configured to receive a second power supply potential, its gate coupled to the gate of the first NMOS transistor, and its source coupled to a fourth node by a second resistor; a decoupling capacitor connected between the second node and a node configured to receive a reference potential; and a decoupling capacitor connected between the fourth node and a node configured to receive the reference potential, wherein the second and fourth nodes are connected to an output node configured to be connected to a first terminal of a circuit to be biased configured to receive a bias current on its first terminal and the reference potential on a second terminal of the circuit to be biased.

2. The bias circuit of claim 1, wherein the current mirror comprises an RC filter between the drain of the first NMOS transistor and the output node or between the gate of the first NMOS transistor and the output node.

3. The bias circuit of claim 2, wherein the RC filter comprises a resistor connected between the gate of the first NMOS transistor and the gate of the second NMOS transistor, and a capacitive element connected between the gate of the second NMOS transistor and the output node.

4. The bias circuit of claim 1, wherein the first and second power supply potentials are positive with respect to the reference potential.

5. The bias circuit of claim 4, wherein the first power supply potential is higher than the second power supply potential, preferably by at least one MOS transistor gate-source voltage.

6. The bias circuit of claim 5, wherein the bias circuit comprises a bandgap circuit coupled to the current source, the bandgap circuit and the current source being configured so that the output current of the current source is determined by a current flowing in the bandgap circuit, for example, so that the output current is a current of temperature-stable type, a current of proportional to absolute temperature type, a current of complementary to absolute temperature type, or a combination of a plurality of currents of temperature-stable or proportional to absolute temperature or complementary to absolute temperature type.

7. The bias circuit of claim 1, wherein dimensions of the second NMOS transistor and dimensions of the first NMOS transistor are configured so that a current in the second NMOS transistor is equal to N times the current in the first NMOS transistor, with N greater than 1, for example greater than 10.

8. A device comprising:

a bias circuit according to claim 1; and a circuit to be biased comprising a first terminal connected to the output node of the bias circuit, and a second terminal connected to the reference potential.

9. The device of claim 8, wherein the circuit to be biased is configured to be powered by a potential difference between its first and second terminals resulting from delivery of the bias current by the bias circuit on the first terminal of the circuit to be biased.

10. The device of claim 8, wherein the circuit to be biased is a radio frequency circuit configured to operate at frequencies higher than 1 GHz, preferably higher than 10 GHz, or even higher than or equal to 20 GHz.

11. The device of claim 8, wherein the circuit to be biased comprises a filtering inductor connected between its second terminal and an internal node of the circuit to be biased, the internal node being coupled to the first terminal of the circuit to be biased.

12. The device of claim 8, wherein the circuit to be biased is an oscillator comprising:

a filtering inductor connected between its second terminal and an internal node of the circuit to be biased;

a third NMOS transistor and a fourth NMOS transistor identical to the third NMOS transistor, the sources of the third NMOS transistor and fourth NMOS transistor being connected to the internal node of the circuit to be biased, the gate of the third NMOS transistor being connected to the drain of the fourth NMOS transistor, and the gate of the fourth NMOS transistor being connected to the drain of the third NMOS transistor;

a first inductor connected between the first terminal and the drain of the third NMOS transistor;

a second inductor connected between the first terminal and the drain of the fourth NMOS transistor; and a capacitive element connected between the drains of the third and fourth NMOS transistors, wherein, preferably, the first and second inductors and the filtering inductor of the oscillator are each implemented by a corresponding conductive line portion.

13. The device of claim 12, wherein the capacitive element of the oscillator comprises a capacitive element with a voltage-controlled value.

14. The device of claim 12, wherein the device further comprises a buffer circuit comprising:

a filtering inductor connected between a node configured to receive the reference potential and a first internal node of the buffer circuit;

a fifth NMOS transistor and a sixth NMOS transistor, identical and each having their source connected to the first internal node, the gate of the fifth NMOS transistor being connected to the drain of the third NMOS transistor and the gate of the sixth NMOS transistor being connected to the drain of the fourth NMOS transistor; and a seventh NMOS transistor and an eighth NMOS transistor, identical, each having their drain connected to a node configured to receive a power supply potential from the buffer circuit, the seventh NMOS transistor having its source connected to the drain of the fifth NMOS transistor and its gate coupled to the gate of the sixth NMOS transistor by a capacitive element and to a second internal node of the buffer circuit by a resistor, the eighth NMOS transistor having its source connected to the drain of the sixth NMOS transistor and its gate coupled to the gate of the fifth NMOS transistor by another capacitive element and to the second internal node by another resistor, the second internal node being configured to receive a bias potential.

15. The device of claim 8, wherein the bias circuit comprises a conductive line portion having one end connected to the decoupling capacitor connected to the second node of the bias circuit and another end connected to the decoupling capacitor connected to the fourth node of the bias circuit, the conductive line portion comprising the second and fourth nodes and the output node of the bias circuit.

* * * * *